United States Patent [19]

Yingling et al.

[11] Patent Number: 4,747,610
[45] Date of Patent: May 31, 1988

[54] PALLET SENSOR FOR LIFT TRUCK

[75] Inventors: Bruce A. Yingling, Sleepy Hollow; Richard A. Peck, McHenry, both of Ill.

[73] Assignee: Barrett Industrial Trucks, Inc., Marengo, Ill.

[21] Appl. No.: 87,347

[22] Filed: Aug. 20, 1987

[51] Int. Cl.$^4$ ............................................. B66F 9/00
[52] U.S. Cl. .................... 280/43.12; 180/271; 340/942; 414/785
[58] Field of Search ............... 280/43.12; 180/271, 180/272, 65.1; 414/785; 340/901, 942

[56] References Cited

U.S. PATENT DOCUMENTS 3,143,358 8/1964 DuBroff ........................... 280/43.12
4,378,191 3/1983 Sato .................................... 280/43.12

Primary Examiner—David M. Mitchell
Attorney, Agent, or Firm—Juettner Pyle Lloyd & Verbeck

[57] ABSTRACT

A pallet sensing system, for a low lift pallet-type fork truck having load wheels extendible downwardly away from and retractable upwardly toward the forks to raise and lower the forks, is characterized by sensors for detecting proper alignment of the fork load wheels with respect to an opening in a bottom deck of a pallet. Upon the forks being extended into the pallet, the sensors disable lift controls of the truck to prevent the wheels from being extended away from the forks to lift the pallet until the sensors detect that the wheels are aligned for unobstructed passage through the bottom deck opening, whereupon the sensors enable the lift controls. The system prevents the pallet bottom deck from being broken by the wheels should an attempt be made to lift the pallet when the wheels are not positioned to pass freely through the opening, but would instead strike and break the bottom deck.

20 Claims, 3 Drawing Sheets

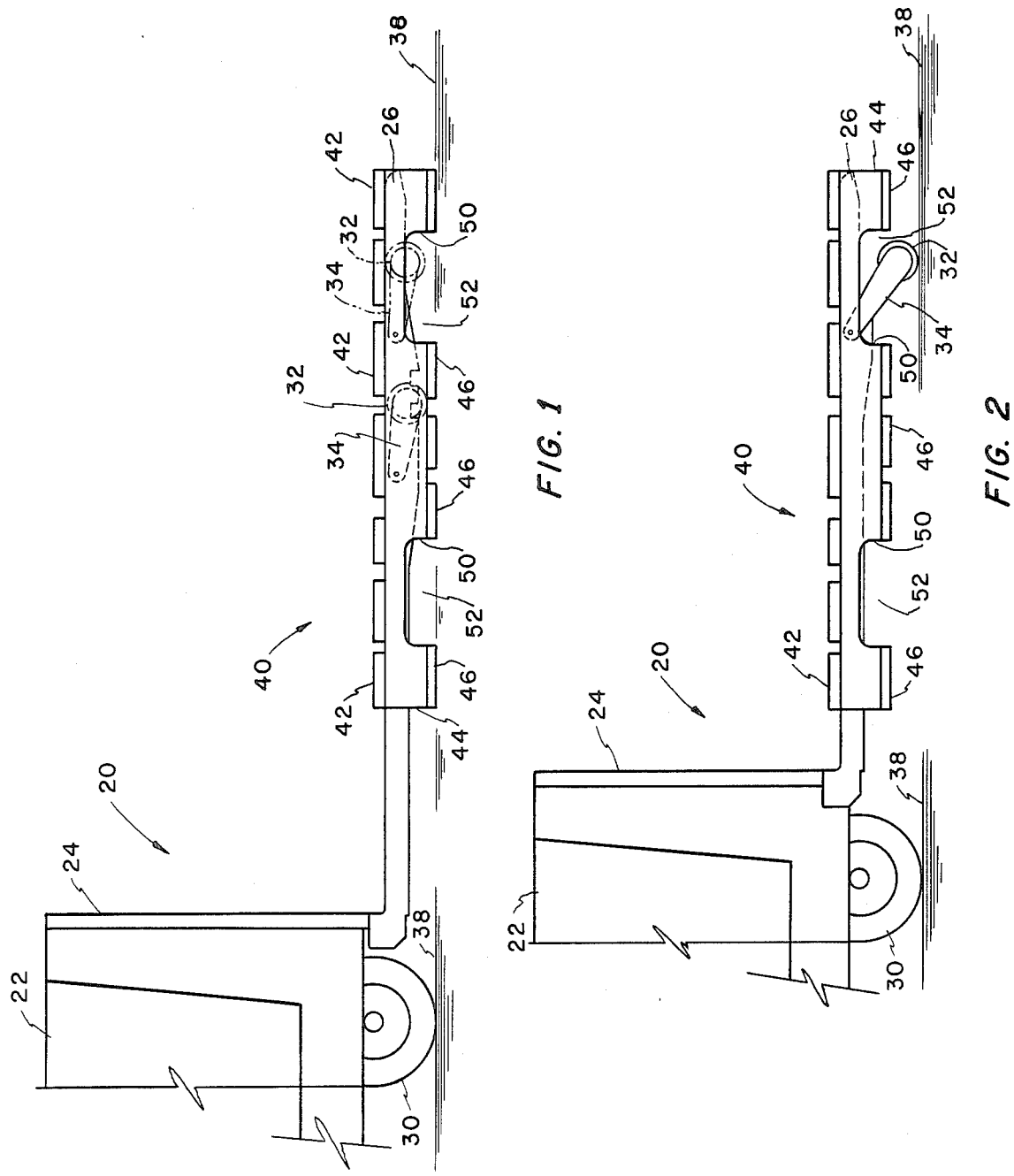

PALLET SENSOR FOR LIFT TRUCK

BACKGROUND OF THE INVENTION

The invention relates to systems for controlling material handling apparatus, and in particular to a system for sensing the positions of fork load wheels of a low lift pallet-type fork truck with respect to an opening in a pallet bottom deck, so that upon lowering the wheels to lift the pallet they and their linkages pass freely through the opening and do not engage and damage the bottom deck.

Various materials, such as food products and the like, are often carried on pallets for convenient transport by a fork lift truck from one location to another. Where the pallets are not required to be lifted to significant heights, the fork lift truck may be of the short lift pallet-type that lifts the pallets to only about 6" above the floor. Such fork lifts usually comprise a rearward operator cab and a pair of horizontal forks extending forwardly from the cab. Each fork carriers one or two load wheels connected to its bottom by a linkage, and the wheels are movable between retracted positions where the forks are lowered and extended positions where the wheels elevated and support forward ends of the forks.

Pallets transported by short lift fork trucks are usually of the 4-way entrance type. They are made of wood, have a top deck formed by a plurality of boards attached at their ends to wooden beams extending perpendicularly of the boards, and a bottom deck formed by a plurality of boards attached at their ends to the beams and defining two 9" wide openings extending perpendicularly of the beams and parallel to the boards about 27" apart from center-to-center. To provide rigidity for the center of the pallet, a center beam extends between and is attached to the top and bottom deck boards about midway between and parallel to the side beams. The three beams are relieved at each of the two openings to define channels through the pallet along the lengths of the openings. The forks of a low lift pallet-type truck are too wide to be extended lengthwise into and through the channels to lift the pallet, so to lift the pallet the forks are extended into passages defined between the top and bottom decks on opposite sides of the center beam, in a direction perpendicular to the bottom deck openings. The forks should be extended into the passages by an amount that positions the load wheels in alignment with the first or second opening, so that when the wheels are lowered to lift the pallet, they and their linkages pass freely through the opening without encountering and breaking any bottom deck boards. Lift trucks having a single wheel per fork require about 7" of opening width for free movement of the wheels and linkages through the opening, so with a 9" wide opening, 2" of leeway are available. If there are two wheels per fork, then about 8.75" of opening width is required for unobstructed movement of the wheels and their linkages, leaving only 0.25" of leeway.

When an operator extends the forks of a low lift pallet-type truck into the pallet in a direction perpendicular to the lengths of the bottom deck openings, because of the top deck and any load carried on the pallet he cannot readily visually observe the positions of the wheels with respect to the openings. If as a result of improper staging the wheels are not correctly positioned, upon lowering them to lift the pallet they and/or their linkages will engage and break one or more bottom deck boards. In addition to errors in staging, also attributing to pallet breakage are different pallet sizes and pallets not manufactured to specification.

Short lift fork trucks have a vertically extending plate at the rearward end of the forks, and one conventional practice contemplates that the wheels be located on the forks such that, upon extension of the forks into the pallet in a direction perpendicular to the lengths of the openings, when the rearward end of the pallet engages the plate, the wheels and their linkages will be positioned for unobstructed downward passage through the bottom deck openings. However, should a load overhang the rearward end of the pallet, the vertical plate will engage it instead of the pallet, the wheels will not be properly aligned with respect to the openings, and upon being lifted the pallet will be broken.

OBJECTS OF THE INVENTION

An object of the present invention is to provide a pallet sensor for a short lift pallet-type fork truck that detects, when the forks are extended into a pallet in a direction perpendicular to lengths of bottom deck openings, when fork load wheels and their linkages are positioned for unimpeded downward movement through an opening to lift the pallet without engaging and breaking the bottom deck.

Another object is to provide such a sensing system that disables lift controls of the truck whenever the forks are within the pallet and the fork wheels are not positioned for unimpeded movement through a bottom deck opening.

A further object is to provide such a system that indicates to an operator whether the forks are improperly or properly positioned, and that enables the lift controls to lift the pallet only when the load wheels and their linkages are positioned for unimpeded movement through a bottom deck opening.

SUMMARY OF THE INVENTION

The present invention provides a system for staging a fork lift with a pallet, wherein the fork lift has load wheels carried by forks and a lift system for extending the wheels away from and retracting the wheels toward bottoms of the forks to raise and lower the forks, the pallet has top and bottom decks defining passages therebetween and the bottom deck has at least one opening therethrough in communication with the passages, and the forks and load wheels are extendible into the pallet passages to lift to the pallet upon extension of the wheels away from the bottoms of the forks. The system comprises sensor means carried on at least one of the forks for detecting the positions of the load wheels with respect to the at least one pallet bottom deck opening when the forks are extended into the pallet passages; and means responsive to the sensor means for generating a signal when the wheels are positioned to be extended away from the forks and through the at least one bottom deck opening, to raise the forks and lift the pallet, without contacting any portion of the bottom deck. Advantageously, the system also includes means, responsive to the sensor means when the forks are extended into the pallet passages, for disabling the lift system from extending the load wheels away from the fork bottoms whenever the wheels are not positioned to be freely extended through the at least one bottom deck opening, and for reenabling the lift system to extend the wheels away from the fork bottoms to lift the pallet when the wheels are positioned to be freely extended through the at least one bottom deck opening. The system therefore prevents the pallet bottom deck from being engaged and broken by the load wheels when the pallet is lifted.

The invention also contemplates a method of staging the fork lift with the pallet, which comprises the steps of extending the forks into the pallet passages with the load wheels moved toward the forks; sensing the positions of the load wheels with respect to the at least one bottom deck opening; and generating a signal upon sensing that the load wheels are positioned to be moved freely downwardly through the at least one bottom deck opening to raise the forks and lift the pallet without contact of the load wheels with any portion of the bottom deck. Preferably, also included are the steps, responsive to the sensing step, of disabling the lift system from moving the load wheels downwardly away from the forks when the forks are extended into the pallet passages and the wheels are not positioned for free downward movement through the at least one bottom deck opening; and reenabling the lift system to move the load wheels downwardly away from the forks when the forks are positioned for free downward movement through the at least one bottom deck opening. In addition, for the purpose of informing an operator of the fork lift of the position of the load wheels, further included are the steps, upon the load wheels being extended into the pallet passages, of generating a first visual indication when the wheels are not positioned for free downward movement, and a second visual indication when the wheels are positioned for free downward movement, through the at least one bottom deck opening.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a side elevation view of a short lift pallet-type fork truck with its forks extended into a pallet, showing one location of the forks when fork load wheels and linkages are not positioned for unobstructed downward movement through an opening in the pallet bottom deck, and another in which the load wheels and linkages are positioned for unobstructed movement through an opening;

FIG. 2 is a side elevation view of the truck, illustrating a pallet carried on the forks with the load wheels and their linkages extended through a bottom deck opening;

DETAILED DESCRIPTION

Figure 3:
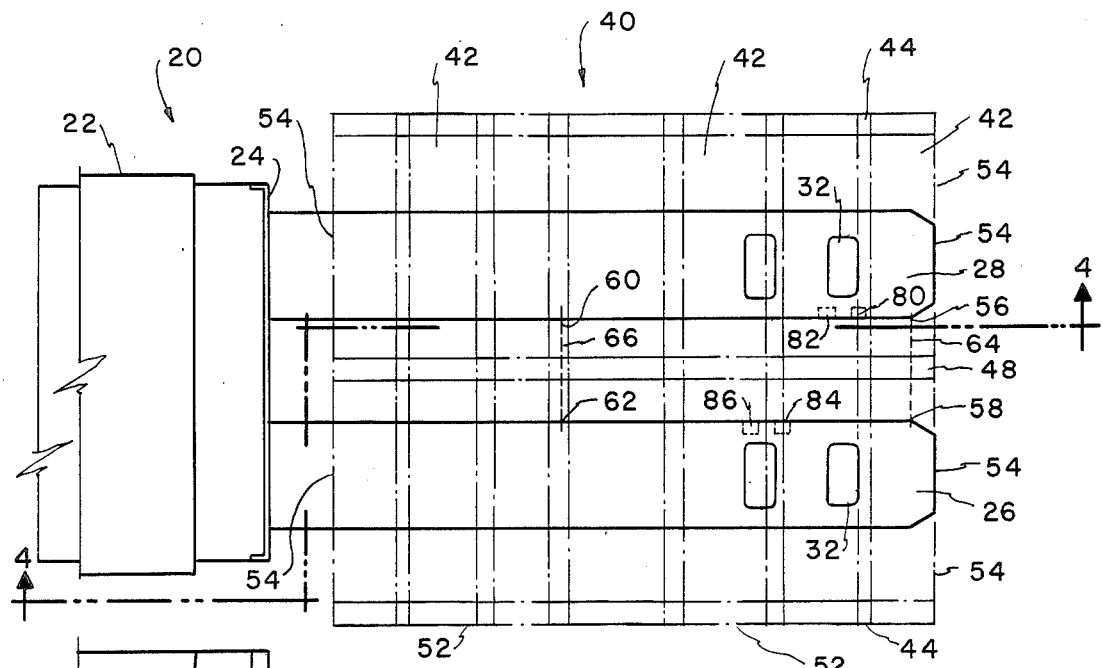
FIG. 3 is a top plan view of the truck with its forks extended through the pallet, showing the arrangement of sensors on the forks for detecting when the wheels and their linkages are positioned for unimpeded downward movement through a bottom deck opening.

The drawings illustrate a short lift pallet-type fork truck, indicated generally at 20, of a type with which the pallet sensing system of the invention advantageously may be used. The truck includes a cab 22, a vertical load plate 24 on a front end of the cab and a pair of forks 26 and 28 extending horizontally forwardly from a lower end of the plate. The cab is supported on a wheel 30, and each fork carries toward its forward end and associated load wheel 32 pivotally connected to the bottom of the fork by a linkage 34. Contained in the cab is a battery supply 36 (FIG. 5) for powering the truck under operator control, for example for driving the wheel 30 and operating a hydraulic pump for a hydraulic cylinder (neither shown) to raise and lower the forks. The hydraulic cylinder is connected to the vertical plate and to the load wheel linkages via tie rods (not shown) extending through the forks. To raise the forks, the cylinder is actuated to move the plate vertically upwardly to raise the rearward end of the forks and to simultaneously pivot the linkages, via the tie rods, to lower the load wheels and raise and support the forward ends of the forks above a floor 38. The maximum elevation of the forks may be on the order of about 6", and to lower the forks the fluid in the hydraulic cylinder may be drained into a reservoir, so that the load wheels are retracted and the forks are lowered by gravity. When the forks are lowered, the wheels continue to support the forks on the floor.

The lift truck 20 is adapted to raise and lower a pallet, indicated generally at 40. The pallet is made of wood, it has a top deck comprising a plurality of boards 42 connected at opposite ends to upper surfaces of side beams 44, and a bottom deck comprising a plurality of boards 46 connected at their ends to lower surfaces of the beams. To provide strength and rigidity for the middle of the pallet, a center beam 48, extending about midway between and parallel to the side beams, also is attached to the top and bottom deck boards. Each of the side and center beams have respectively aligned first and second relieved areas 50 defining a pair of channels above bottom deck openings 52 extending transversely of the beams. As is conventional, the openings have a width of about 9" and a center-to-center spacing of about 27".

The pallet as shown is of the 4-way entrance type. However, the forks 26 and 28 of the pallet-type truck are too wide to enter and lift the pallet by being extended lengthwise into the channels defining the bottom deck openings 52, so they must be extended into passages 54 defined on opposite sides of the center beam 48 and between the top and bottom decks and side beams 44. When the forks are extended through the passages, in a direction perpendicular to the lengths of the openings, care must be taken to ensure that the wheels 32 and their linkages 34 are properly positioned with respect to one of the openings 50, so that they may move freely downwardly through the opening to lift the pallet without contacting and breaking any bottom deck boards 46. One position of the forks at which the wheels and their linkages are not positioned to move freely downwardly through a pallet opening is shown to the left in FIG. 1, where the wheels and linkages are about midway between the openings and above bottom deck boards. Should the operator lift the forks at this time, downward movement of the wheels and linkages will engage and break one or more bottom deck boards. On the other hand, with the forks positioned as shown to the right in FIG. 1, the wheels and linkages are aligned for unobstructed downward movement through the forward bottom deck opening, so the forks may be raised to lift the pallet without breaking bottom deck boards, as seen in FIG. 2. However, it is difficult for the operator to extend the forks through the passages 54 by an amount properly aligning the wheels and their linkages for free passage through a bottom deck opening, since the top deck and any load carried by the pallet blocks the operator's view and he cannot readily observe the locations of the wheels and linkages. In addition, aggravating the problem of proper staging are the very limited tolerances for error. For a single pallet truck, the wheels and linkages require about 7.00" clearance for unobstructed downward movement, so with a 9" wide opening, the operator is constrained to a staging tolerance of about 2.00". A double pallet truck with extended forks and two load wheels per fork, on the other hand, requires about 8.75" clearance for unobstructed movement of the wheels and linkages, which limits the operator to a staging tolerance of only 0.25" if the pallet is not to be broken. The bottom deck boards are therefore often broken by errors in staging, and contributing to breakage are different pallet sizes and pallets not manufactured to specification.

To eliminate pallet breakage due to improper staging when the truck forks 26 and 28 are extended into the pallet passages 54, the invention contemplates a sensing system for detecting orientation of the fork load wheels 32 and linkages 34 with respect to the pallet bottom deck openings 52, and for providing indications of proper or improper staging. The system has two sensing means, one of which is a photoelectric sensing means that detects when the forks are in the pallet passages. The other is an infrared sensing means that detects when the wheels and linkages are positioned for unobstructed movement through a bottom deck opening.

Figure 4:
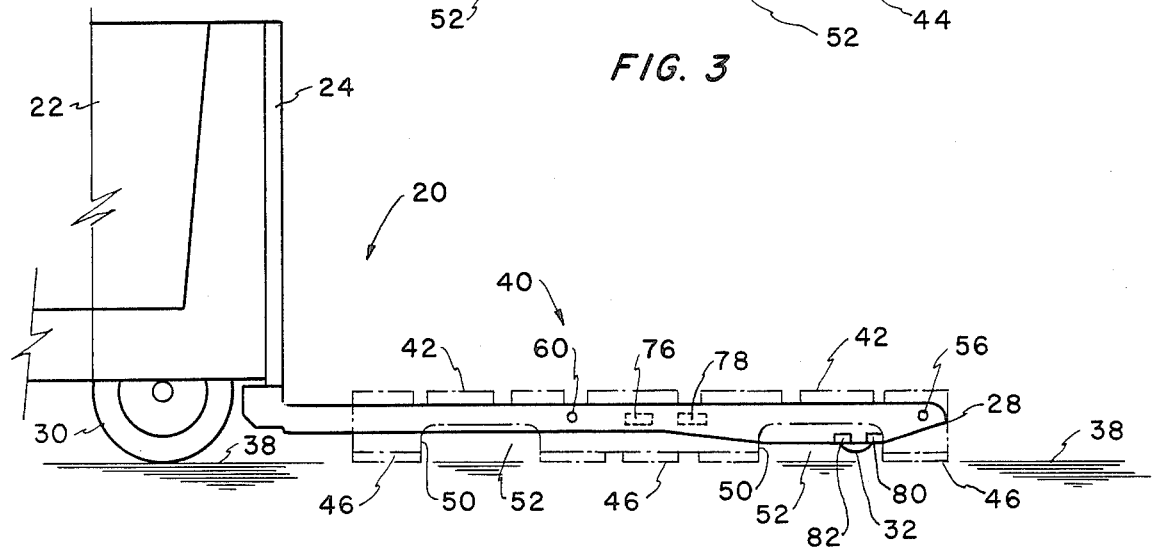
FIG. 4 is a side elevation view, taken substantially along the lines 4—4 of FIG. 3.
Figure 5:
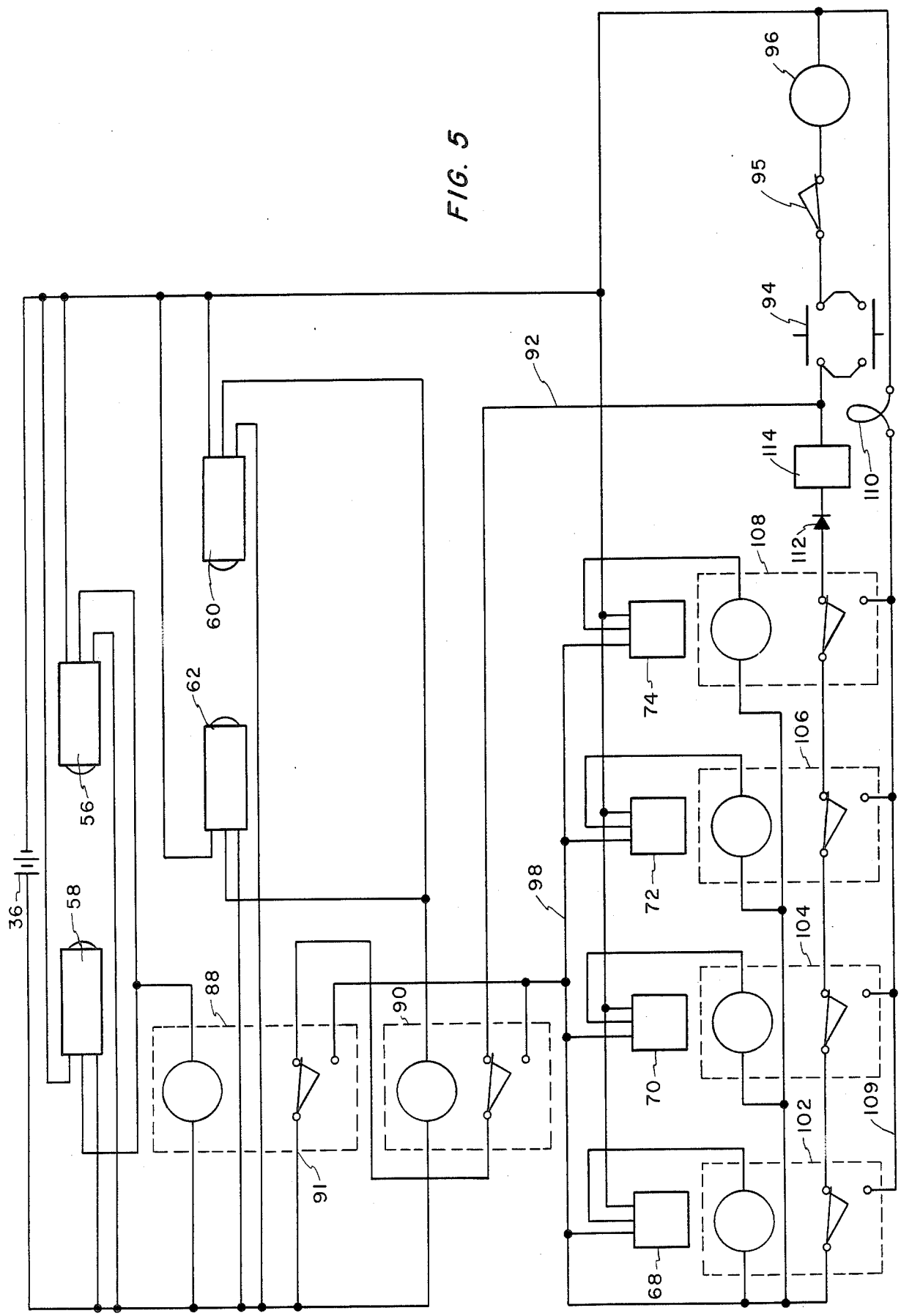
FIG. 5 is a schematic representation of the pallet sensor circuit.

With particular reference to FIGS. 3–5, the photoelectric sensing means comprises a first photocell 56 and associated light source 58. If the lift truck is of the double pallet type, i.e., if it has forks that are sufficiently long to extend through two pallets simultaneously, then the photoelectric sensing means also includes a second photocell 60 and associated light source 62. The photocells are carried within the truck fork 28, the light sources are within the fork 26 in opposing relationship to their associated photocells, and openings in the forks permit light beams 64 and 66 from the light sources 58 and 62 to impinge upon the photocells 56 and 60. The front photocell 56 and its light source 58 are forwardly of the wheels 32 and linkages 34. For a double pallet truck, the rear photocell 60 and its light source 62 are rearwardly of the wheels and linkages, and are spaced from the front photocell and light source by a distance less than the length of the pallet 20 along the passages 54. The purpose of the photoelectric sensing means is to detect when the forks are extended into the pallet passages 54 by an amount where lowering of the load wheels might damage the bottom deck, and to then inhibit operation of lift controls until the infrared sensing means detects that the wheels and linkages are positioned to move freely downwardly through a pallet opening 52, at which point the lift controls are enabled by the infrared sensing means so that the operator may lift the pallet. In essence, and as will be described in greater detail, when the forks are not extended into the pallet and the light beam 64 (along with the light beam 66 for a double pallet truck) is unbroken, the lift controls are enabled and the operator may raise the forks. However, upon extension of the forks into the pallet passages 54 by an amount sufficient to break the light beam 64 with the center beam 48, the lift controls are disabled, so the operator cannot raise the forks, and the infrared sensing means is energized. As the forks are extended further into the pallet passages, the infrared sensing means "looks for" a bottom deck opening, and when it detects an opening and proper orientation of the load wheels and linkages with respect to the opening, it reenables the lift controls so the operator may raise the forks to lift the pallet. The infrared sensing means is carried by the forks rearwardly of the photocell 56, and the photocell(s) are at an elevation above the center beam relieved areas 50 and are longitudinally positioned such that each is within the pallet when the infrared sensing means detects the forward bottom deck opening.

The infrared sensing means comprises four infrared sensors 68, 70, 72 and 74. Each includes an amplifier and a fiber optic cable pair, one end of which extends into the amplifier and the other end of which is free. The amplifier has an infrared source, and one of the cables of the pair transmits radiation from the source to its free end, from which the radiation is emitted. The free end of the other cable of the pair receives any emitted infrared radiation that strikes and is reflected back from an object, and carries it to an adjustable sensitivity radiation detector of the amplifier to cause the amplifier to generate a first or a second output in accordance with the detected energy level of reflected radiation being at least equal to or less than a predetermined level. Each infrared sensor may comprise an amplifier of a type sold by Omron Electronics, Inc. under part No. E3S-X2CE4, and a fiber optic cable pair sold under part No. E32-CC200.

Two infrared sensors, including their amplifiers and fiber optic cable pairs, are carried in each fork 26 and 28, of which only amplifiers 76 and 78 (FIG. 4) in the fork 28 are shown. The free ends of the fiber optic cable pairs in the fork 28 are mounted facing downwardly at sensing locations 80 and 82 along the inside bottom of the fork, and the free ends of the fiber optic cable pairs in the fork 26 are mounted facing downwardly at sensing locations 84 and 86 along the inside bottom of that fork. The sensing locations are oriented with respect to the wheels 32 and linkages 34 such that, when the free ends of the cables are all simultaneously over a pallet bottom deck opening 52, the wheels and linkages are positioned for unobstructed downward movement through the opening. Thus, for 9" wide openings in the pallet bottom deck, the distance between the sensing locations 80 and 86, measured longitudinally along the forks, is slightly less than 9". On the other hand, and for a purpose as will be described, the distance between the sensing locations 80 and 82, and between the sensing locations 84 and 86, is on the order of 2.75" to 3.0".

Considering the pallet bottom deck opening sensing system in greater detail, for a double pallet truck the circuit of the system is powered by the truck battery 36 and includes the photocells 56 and 60 and their respective light sources 58 and 62, along with the infrared sensors 68, 70, 72 and 74. The circuit is shown in its state when the truck forks 26 and 28 are not extended into the pallet and the light beams 64 and 66 are not broken, under which condition the photocell 56 maintains a relay 88 deenergized and the photocell 60 maintains a relay 90 deenergized. With both relays deenergized, positive battery at an input terminal 91 to the relay 88 is applied through the relay 90 and over a conductor 92 to one side of a lift control switch 94, the other side of which connects through a fork height limit switch 95 to a hydraulic pump 96 for the fork lift cylinder. When the forks are not extended into the pallet, actuation of the lift control switch 94 therefore permits the operator to elevate the forks, with maximum elevation being determined by the fork height limit switch. A circuit (not shown) for lowering the forks may comprise a switch that is actuable to drain hydraulic fluid from the cylinder into a reservoir to lower the forks by gravity.

The relays 88 and 90 are also adapted to apply battery power to the infrared sensors 68, 70, 72 and 74, by connecting positive battery to a line 98 when at least one of the relays is energized. However, when both relays are deenergized, i.e., when neither light beam 64 and 66 is broken, positive battery does not appear on the line 98 and the infrared sensors are deenergized.

In operation of the circuit to sense a pallet bottom deck opening 52, upon movement of the truck forks 26 and 28 into the pallet passages 54 by an amount where the center beam 48 interrupts the light beam 64, the relay 88 is energized by the photocell 56 to remove positive battery from the line 92 to the lift control switch 94, so that actuation of the switch will not cause the forks to be raised, and to instead apply positive battery to the line 98 to energize the infrared sensors 68, 70, 72 and 74. The infrared sensors control respective relays 102, 104, 106 and 108, such that when the amplifier of a sensor detects at least the predetermined energy level of reflected infrared radiation at its associated sensing location 80, 82, 84 or 86, the relay it controls is energized to apply positive battery to a line 109 and illuminate a lamp 110 in the truck cab 22. Infrared radiation emitted from the free ends of the fiber optic cable pairs is diffused, and each amplifier is adjusted so that the detected energy level of reflected radiation is at least equal to the predetermined level whenever the free end of its associated cable pair is above a bottom deck board 46. However, when the free end is above a space between the boards and therefore above the floor, the floor is spaced sufficiently far from the free end that the energy level of radiation reflected back to the free end is less than the predetermined level, and the controlled relay is deenergized. Whenever a relay is deenergized, it completes a portion of a circuit from positive battery on the line 98 to the anode of a diode 112, the cathode of which connects through a one second delay circuit 114 to the one side of the lift control switch 94.

Accordingly, upon movement of the sensing locations 80, 82, 84 and 86 into the pallet passages 54, at least one will at all times be above a bottom deck board 46, so at least one of the relays 102, 104, 106 and 108 will be energized to remove positive battery from the anode of the diode 112 and apply positive battery to the line 109 to illuminate the lamp 110, until all of the sensing locations are simultaneously above the rearward bottom deck opening. When this occurs, all of the relays are simultaneously deenergized to extinguish the lamp and complete the circuit from the line 98 to the anode of the diode to apply positive battery through the diode to the delay circuit 114.

If the operator were to stop forward movement of the lift truck at this point, upon application of positive battery to the lift control switch 94 after expiration of the one second delay inserted by the circuit 114, he could actuate the lift control switch and elevate the forks, with the wheels 32 and their linkages 34 then moving downwardly through the rearward bottom deck opening without engaging and breaking any bottom deck boards 46, and this is what the operator might do if the truck 20 were a double pallet truck. However, with a single pallet truck the pallet usually is lifted with the load wheels extended through the forward bottom deck opening, so with such a truck the operator normally would not stop with the load wheels and linkages aligned for movement through the rearward opening. Instead, he would continue to extend the forks through the pallet passages 54, whereupon the sensing locations 80, 82, 84 and 86 will again move above bottom deck boards. When this occurs, at least one of the relays 102, 104, 106 and 108 will be energized, again removing positive battery from the lift control switch 94 so that the operator can no longer raise the forks, and instead applying it to the line 109 to illuminate the lamp 110, until such time as all of the sensing locations are simultaneously above the forward bottom deck opening, as indicated by a subsequent extinguishing of the lamp. Extinguishing of the lamp for the second time signals the operator to stop the truck, and after the one second delay inserted by the circuit 114, positive battery from the line 98 is applied to the lift control switch so that the operator can elevate the forks and lift the pallet, with the load wheels and their linkages moving freely downwardly through the forward bottom deck opening without engaging and breaking any bottom deck boards.

The delay circuit 114 eliminates the potential for damage to the pallet should the operator drive the forks of the lift truck into the pallet while maintaining the lift control switch 94 actuated. Because of the delay inserted by the circuit in applying battery to the lift control switch, before the operator can elevate the forks he must first bring the truck to a stop with all of the sensing locations 80, 82, 84 and 86 simultaneously positioned above a bottom deck opening, and then wait for the circuit to time out.

As mentioned, rearward photocell 60 and light source 62 are provided when the sensing system is used with a double pallet truck, i.e., one having forks of sufficient length to simultaneously lift and support two pallets. The distance between the photocells 56 and 58, in the direction longitudinally along the truck forks 26 and 28, is less than the length of a pallet in the direction along its passages 54. In the absence of the rearward photocell 60, if a double pallet truck were used to lift a single pallet, should the forks be moved through the pallet by an amount sufficient to move the photocell 56 and its light source 58 out of the pallet passages, reestablishment of the light beam 64 would deenergize the relay 88 and enable the lift control switch 94 to be used to elevate the forks, despite the fact that the load wheels 32 and/or their linkages 34 might still be within the pallet. However, because of the rearward photocell 60, should the forward photocell 56 be moved through and out of the pallet, the rearward photocell will maintain the relay 90 energized and prevent the operator from raising the forks while the wheels and linkages are still in the pallet. Should the sensing system be used on a single pallet truck, then none of the photocell 60, light source 62 and relay 90 would be required, in which case the relay 88, when in its deenergized state, would connect positive battery at its input 91 directly to the line 92 and lift control switch 94.

It is to be appreciated that although the sensing system has been described as having four infrared sensors 68, 70, 72 and 74, and four sensing locations 80, 82, 84 and 86, orientation of the load wheels and their linkages with respect to pallet bottom deck openings could be accomplished using just two of each, i.e., the sensing locations 80 and 86 and their associated infrared sensors. However, if only two sensing locations are used, in staging with a pallet not constructed to specification, it could happen that the sensors might simultaneously detect slots on opposite sides of a board underlying the load wheels and linkages. Therefore, to prevent false indications of proper staging, the system advantageously includes the sensing locations 82 and 84.

In addition, although two infrared sensors are on each of the forks 26 and 28, all four sensors may be on one fork only. However, since the forks may enter the pallet passages at an angle, it is believed that improved accuracy in staging is achieved by placing two sensors on each fork, instead of all four on one.

While embodiments of the invention has been described in detail, various modifications and other embodiments thereof may be devised by one skilled in the art without departing from the spirit and scope of the invention, as defined in the appended claims.

What is claimed is:

1. A system for staging a fork lift with a pallet, wherein the fork lift has load wheels carried by forks and a lift system for extending the wheels away from and retracting the wheels toward bottoms of the forks to raise and lower the forks, the pallet has top and bottom decks defining passages therebetween and the bottom deck has at least one opening therethrough in communication with the passages, and the forks and load wheels are extendible into the pallet passages to lift the pallet upon extension of the wheels away from the bottoms of the forks, said system comprising sensor means carried on at least one of the forks for detecting the positions of the load wheels with respect to the at least one pallet bottom deck opening when the forks are extended into the pallet passages; and means responsive to said sensor means for generating a signal when the wheels are positioned to be extended away from the forks and through the at least one bottom deck opening to raise the forks and lift the pallet without contacting any portion of the bottom deck.

2. A system as in claim 1, further including means, responsive to said sensor means when the forks are extended into the pallet passages, for disabling the lift system from extending the load wheels away from the fork bottoms whenever the wheels are not positioned to be freely extended through the at least one bottom deck opening without contacting the bottom deck.

3. A system as in claim 2, wherein said sensor means comprises first sensing means for detecting extension of the forks into the pallet passages and second sensing means for detecting the positions of the load wheels with respect to the at least one bottom deck opening, said first sensing means enabling the lift system when the forks are out of the pallet passages and disabling the lift system when the forks are extended into the pallet passages, and said second sensing means reenabling the lift system upon detecting that the load wheels are positioned to be freely extended through the at least one bottom deck opening.

4. A system as in claim 3, wherein the pallet has a wall extending between and along the passages, and said first sensing means includes a photoelectric detector for generating a light beam that is broken by the wall when the forks are extended into the pallet passages, and means for disabling the lift system upon the light beam being broken.

5. A system as in claim 3, wherein said second sensing means includes at least two infrared sensors, having sensing locations forwardly and rearwardly of the load wheels, for detecting the at least one bottom deck opening and for generating said signal when the load wheels are positioned for unobstructed movement through the at least one opening.

6. A system as in claim 5, wherein the at least one bottom deck opening is a single opening and said at least two infrared sensors generate said indication when all of said sensing locations simultaneously overlie the opening.

7. A system as in claim 3, including means for delaying reenabling of the lift system for a selected time upon said second sensing means detecting that the load wheels are positioned for free downward movement through the at least one bottom deck opening.

8. A system for staging a fork lift truck with a pallet, wherein the truck has a pair of horizontal forks, at least one load wheel carried by each fork and a lift system for moving the wheels away from and toward bottoms of the forks to raise and lower the forks, the pallet has top and bottom decks defining a pair of parallel passages therebetween and the bottom deck has an elongate opening extending transversely of and in communication with the passages, and the truck forks and load wheels are extendible into the pallet passages with the load wheels moved upwardly toward the forks, said system comprising sensor means carried on the forks for detecting when the forks are in the pallet passages and the positions of the load wheels with respect to the bottom deck opening; and means responsive to said sensor means for generating a signal when the wheels are positioned to be freely moved downwardly through the bottom deck opening to raise the forks and lift the pallet without contacting any portion of the bottom deck.

9. A system as in claim 8, including means responsive to said sensor means for disabling the lift system upon said sensor means detecting that the forks are in the pallet passages and for reenabling the lift system upon said sensor means detecting that the load wheels are positioned to be freely moved downwardly through the bottom deck opening, whereby engagement of the load wheels with and breakage of the pallet bottom deck are prevented.

10. A system as in claim 8, wherein said sensor means comprises first sensing means for detecting movement of the forks into the pallet passages and second sensing means for detecting when the load wheels are positioned for free movement through the bottom deck opening.

11. A system as in claim 10, including means for disabling the lift system in response to said first sensing means detecting movement of the forks into the pallet passages, and means for reenabling the lift system in response to said second sensing means detecting that the wheels are positioned for free movement through the bottom deck opening.

12. A system as in claim 10, wherein the pallet has a wall extending between and along the pallet passages, and said first sensing means includes photoelectric detector means toward a forward end of the forks for establishing a light beam between the forks and for generating an indication of movement of the forks into the pallet passages upon the light beam being broken by the pallet wall.

13. A system as in claim 10, wherein said second sensing means includes at least two infrared sensors carried on at least one of the forks, at least one infrared sensor having a sensing location forwardly of and at least one rearwardly of the load wheels, for detecting the bottom deck opening and for generating an indication that the wheels are positioned for free movement through the opening when each sensing location simultaneously overlies the opening.

14. A system as in claim 10, wherein the pallet has a wall extending between and parallel to the passages, said first sensing means comprises photoelectric detector means forwardly of the load wheels for establishing a light beam between the forks and for generating a first signal when the light beam is unbroken and a second signal when the light beam is broken by the wall upon extension of the forks into the pallet passages, said second sensing means comprises infrared sensing means on the forks rearwardly of said photoelectric detector means, said infrared sensing means having a sensing location forwardly of and a sensing location rearwardly of the load wheels and generating a third signal wherever said second signal is being generated and at least one of said sensing locations is above the pallet bottom deck and a fourth signal wherever said second signal is being generated and both of said sensing locations are simultaneously above the bottom deck opening, and including means responsive to said first, second, third and fourth signals for enabling the lift system when said first signal is generated when the forks are not extended into the pallet passage, for disabling the lift system when said second and third signals are being generated upon said light beam being broken by the pallet wall when the forks are extended into the pallet passages and while at least one of said sensing locations are above the bottom deck, and for reenabling the lift system when said second and fourth signals are generated upon the forks being extended into the pallet passages by an amount that simultaneously places all of said sensing locations above the bottom deck opening, whereby when the forks are extended into the pallet passages the lift system is enabled to lower the load wheels to lift the pallet only when the load wheels are positioned for free downward movement through the bottom deck opening.

15. A system as in claim 14, including means for delaying reenabling of the lift system for a predetermined time after generation of said second and fourth signals.

16. A system as in claim 8, including means, responsive to said sensor means, for generating a first visual indication when the forks are in the pallet passages and the load wheels are not positioned to be freely moved downwardly through the bottom deck opening and a second visual indication when the forks are in the pallet passages and the wheels are positioned to be freely moved downwardly through the bottom deck opening.

17. A method of staging a fork lift with a pallet, wherein the fork lift has load wheels carried by forks and a lift system for moving the wheels away from and toward bottoms of the forks to raise and lower the forks, the pallet has top and bottom decks defining passages therebetween and the bottom deck has at least one opening in communication with the passages, and the forks and load wheels are extendible into the pallet passages to lift the pallet upon movement of the load wheels by the lift system downwardly from the forks, said method comprising the steps of extending the forks of the fork lift into the pallet passages with the load wheels moved toward the forks; sensing the positions of the load wheels with respect to the at least one bottom deck opening; and generating a signal upon sensing that the load wheels are positioned to be moved freely downwardly through the at least one bottom deck opening to raise the forks and lift the pallet without contact of the load wheels with any portion of the bottom deck.

18. A method as in claim 17, including the steps of disabling the lift system from moving the load wheels downwardly away from the forks when the forks are extended into the pallet passages and the load wheels are not positioned for free downward movement through the at least one bottom deck opening; and reenabling the lift system to move the load wheels downwardly away from the forks when the forks are extended into the pallet passages and the load wheels are positioned for free downward movement thought the at least one bottom deck opening.

19. A method as in claim 18, including the step of delaying reenabling of the lift system for a predetermined time upon sensing that the load wheels are positioned for free downward movement through the at least one bottom deck opening.

20. A method as in claim 18, including the step, upon the load wheels being extended into the pallet passages, of generating a first visual indication when the load wheels are not positioned for free downward movement, and a second visual indication when the load wheels are positioned for free downward movement, through the at least one bottom deck opening.

* * * * *